(12) United States Patent
Insler et al.

(10) Patent No.: US 8,213,454 B2
(45) Date of Patent: Jul. 3, 2012

(54) SELF-ADAPTING MECHANISM FOR MANAGING DATA STREAMS IN A MULTIPLE ACCESS SHARED NETWORK

(75) Inventors: Romain Insler, Kermaria-Sulard (FR); Joël Penhoat, Lannion (FR); François Eleouet, Trebeurden (FR)

(73) Assignee: France Telecom, Paris (FR)

( * ) Notice: Subject to any disclaimer, the term of this patent is extended or adjusted under 35 U.S.C. 154(b) by 22 days.

(21) Appl. No.: 12/087,327

(22) PCT Filed: Dec. 22, 2006

(86) PCT No.: PCT/FR2006/051421
§ 371 (c)(1),
(2), (4) Date: Feb. 5, 2009

(87) PCT Pub. No.: WO2007/074310
PCT Pub. Date: Jul. 5, 2007

(65) Prior Publication Data
US 2009/0219815 A1    Sep. 3, 2009

(30) Foreign Application Priority Data

Dec. 27, 2005   (FR) .................................. 05 54111

(51) Int. Cl.
*H04L 12/413*  (2006.01)
*G01R 31/08*   (2006.01)
(52) U.S. Cl. ....................................... 370/445; 370/237

(58) Field of Classification Search .................. 370/237, 370/445
See application file for complete search history.

(56) References Cited

U.S. PATENT DOCUMENTS

| 6,091,709 | A  | * | 7/2000 | Harrison et al. | 370/235 |
|---|---|---|---|---|---|
| 6,144,636 | A  | * | 11/2000 | Aimoto et al. | 370/229 |
| 6,714,517 | B1 | * | 3/2004 | Fawaz et al. | 370/236 |
| 2003/0067903 | A1 | * | 4/2003 | Jorgensen | 370/338 |
| 2003/0198247 | A1 | * | 10/2003 | Gardner et al. | 370/445 |
| 2004/0066743 | A1 | * | 4/2004 | Shimojo et al. | 370/229 |
| 2005/0063402 | A1 | * | 3/2005 | Rosengard et al. | 370/412 |

FOREIGN PATENT DOCUMENTS

EP    0 587 522 A2    3/1994

OTHER PUBLICATIONS

Kweon et al., "Soft Real-Time Communication over Ethernet with Adaptive Traffic Smoothing", IEEE Transactions on Parallel and Distributed Systems, vol. 15, No. 10, pp. 946-959, Oct. 2004.

* cited by examiner

*Primary Examiner* — Ricky Ngo
*Assistant Examiner* — Paul H Masur
(74) *Attorney, Agent, or Firm* — Cozen O'Connor

(57) ABSTRACT

A method and a system for managing the transmission of data streams by a terminal of a multiple-access shared communications network, said data streams being structured as data frames and comprising at least one priority data stream and at least one non-priority data stream. The method comprises the steps of determining a congestion state of said multiple-access shared network, and managing the transmission by said station of said priority and non-priority data streams as a function of said congestion state.

17 Claims, 4 Drawing Sheets

SELF-ADAPTING MECHANISM FOR MANAGING DATA STREAMS IN A MULTIPLE ACCESS SHARED NETWORK

RELATED APPLICATIONS

This is a U.S. national stage under 35 USC 371 of application No. PCT/FR2006/051421, filed on Dec. 22, 2006.

This application claims the priority of French patent application no. 05/54111 filed Dec. 27, 2005, the content of which is hereby incorporated by reference.

FIELD OF THE INVENTION

The present invention relates to a self-adaptive mechanism for managing streams in a multiple-access shared network.

The invention relates more particularly, but not exclusively, to the field of local area networks, in particular those using Ethernet protocols operating with a half duplex link (i.e. data transmission passing over such a network in only one direction at a time); WiFi (acronym for wireless fidelity); or indeed PLCI (acronym for power line communication indoor), making use of domestic electrical wiring as a medium for conveying signals carrying data.

BACKGROUND OF THE INVENTION

In a shared network, all of the terminals are connected to a single channel that passes all of the data frames transmitted or received by said terminals. When the network is a multiple-access network, two different terminals can transmit data frames at the same instant. Those frames collide.

The article entitled "Soft real-time communication over Ethernet with adaptive traffic smoothing" published in the journal IEEE Transactions on Parallel and Distributed Systems, Vol. 15, No. 10, October 2004, describes a mechanism seeking to improve the quality of service (QoS) of multiple-access shared networks, i.e. to reduce the transit times of so-called real-time or priority data streams.

To achieve that object, that document describes an adaptive mechanism for regulating streams referred to as adaptive traffic smoother (ATS). That mechanism consists in controlling the data rate of non-priority data frames transmitted by a terminal. In the ATS mechanism, the priority data streams are always sent to the network regardless of the state of congestion of said network, even when there are numerous collisions between frames.

The ATS mechanism makes it possible to obtain better forwarding of data frames since it enables the number of collisions to be reduced, thereby having the consequence of increasing the effective data rate of the network.

Nevertheless, in spite of using the ATS mechanism, the proposed quality of service remains insufficient. Although it enables the number of frame collisions in the network to be reduced, the ATS mechanism does not enable them to be eliminated completely, and that can be problematic, in particular with priority data streams that need to be forwarded in real time in order to obtain a satisfactory quality of service.

SUMMARY OF THE INVENTION

An object of the present invention is to improve quality of service by proposing a method of managing the transmission of data streams by a terminal of a multiple-access shared communications network, said data streams being structured as data frames.

One aspect of the invention is directed to a method that comprises the steps of:
- determining a congestion state of said multiple-access shared network; and
- managing the transmission by said station of said priority and non-priority data streams as a function of said congestion state.

Thus, the technical problem of improving the quality of service over the network is solved by performing self-adaptive control over the transmission of streams as a function of the state of the network, which is not done in the prior art. Although the prior art envisages regulating the bit rate of non-priority streams, it does not propose modifying the bit rate of priority streams, which are real-time streams, the person skilled in the art therefore believing that it is not possible for them to be delayed since they are required to be forwarded without constraints.

Another aspect of the invention relies on determining the congestion state of the network, i.e. the presence or absence of frame collisions on the network, and the frequency thereof. Thereafter, the transmission of data streams, both priority streams and non-priority streams, is regulated as a function of the congestion state as determined during the preceding step. By acting in this way on all of the streams transiting over the network, and by adapting automatically to the congestion state of the network at any given instant, the quality of service over the network is increased in significant manner compared with the prior art.

In a first implementation of the present invention, during said step of determining said congestion state, a first variable is evaluated that is representative of a collision rate of said data frames transmitted by said terminal, and a second variable is evaluated that is representative of a number of priority data frames retransmitted more than N times by said terminal during a period referred to as a "collection" period, where N is a predetermined natural number, and:
- when said first and second variables are zero, said network is in a state referred to as "non-congested";
- when said first and second variables are strictly positive, said network is in a state referred to as "congested"; and
- when said first variable is strictly positive and said second variable is zero, said network is in a state referred to as "intermediate".

Thus, two pertinent variables are identified that characterize the state of the network, which variables can be combined to give four states, comprising three orthogonal states and one impossible state. Authorization to transmit frames and the frame transmission rate are then functions of one of said three states. Naturally, it is also possible to envisage using other variables that are representative of collisions and of network loading in order to determine its congestion state.

In another implementation of the method of the invention, said determining step is performed at time intervals corresponding to the duration of said collection period, so as to update said congestion state of said network.

The method is thus highly reactive, since it regularly updates the congestion state of the network, and it is therefore possible to adapt the transmission of frames quickly as a function of said updated congestion state.

In another implementation of the method of the present invention, said managing step prevents said priority and non-priority data frames being transmitted when said network is in said congested state, and prevents said non-priority data frames being transmitted when said network is in said intermediate state.

Thus, contrary to the prejudices of the person skilled in the art, the transmission of priority streams is also controlled and, contrary to the teaching of the state of the art, said transmission is prevented when the network is congested, even though the priority data streams are real-time data streams.

In another variant implementation of the method of the invention, said managing step implements a token-based method for regulating the rate at which said non-priority data frames are transmitted, the transmission of a non-priority data frame being conditional, when said network is in said non-congested state, on the presence of at least one token in said regulation mechanism.

Advantageously, the number of tokens present in said regulation mechanism is reduced when said network is in said intermediate state or in said congested state, so as to reduce the bit rate of said non-priority streams.

The bit rate of the token bucket is thus regulated, thereby regulating the non-priority streams, as a function of the congestion state of the network, in such a manner as to avoid the non-priority streams clogging the network when the network is already subject to collisions, thereby encouraging the forwarding of priority streams.

In another implementation of the method of the present invention, during said determining step, there is also calculated a parameter for weighting an instant at which a data frame is transmitted, said parameter taking account of said first and second variables evaluated during said collection period and during at least one preceding collection period, so as to smooth the transmission instants of at least some of said data frames during said control step.

This avoids the frame transmission instant varying jerkily, which is a drawback in the prior art.

In a variant implementation of the method of the present invention, the duration of said collection period is modified as a function of said congestion state.

It is thus possible to improve the stability or the reactivity of the mechanism depending on circumstances (by increasing or decreasing the duration of the collection period), by adapting it automatically to the congestion state of the network.

Finally, in an implementation of the method of the present invention, when said network is in said intermediate state, the duration of said collection period is weighted by said weighting parameter, so as to improve the reactivity of said control method.

Another aspect of the invention is directed to a computer program product including program code instructions recorded on a medium readable by a computer for implementing the steps of the above-described method when said program is executed on a computer.

Another aspect of the invention is directed to a terminal for transmitting/receiving data streams over a multiple-access shared communications network, said data stream being structured as data frames comprising at least one priority data stream and at least one non-priority stream, wherein the terminal includes:
  means for determining a congestion state of said multiple-access shared network; and
  means for managing the transmission of said priority and non-priority data streams as a function of said congestion state.

In a variant embodiment of the terminal of the present invention, said means for determining a congestion state of said network evaluate a first variable that is representative of a collision rate of said data frames transmitted by said terminal, and a second variable is evaluated that is representative of a number of priority data frames retransmitted more than N times by said terminal during a period referred to as a "collection" period, where N is a predetermined natural number, and said determination means deliver network congestion state information according to which:
  when said first and second variables are zero, said network is in a state referred to as "non-congested";
  when said first and second variables are strictly positive, said network is in a state referred to as "congested"; and
  when said first variable is strictly positive and said second variable is zero, said network is in a state referred to as "intermediate".

In another aspect embodying the terminal of the present invention, said means for managing the transmission of said data streams comprise:
  a module for regulating a transmission data rate for said non-priority data streams, making use of a token-based mechanism, the transmission of a non-priority data frame being conditional, when said network is in said non-congested state, on there being at least one token present in said regulation mechanism; and
  a module for managing the transmission of data frames that prevent transmission of said priority and non-priority data frames when said network is in said congested state, and that prevents transmission of said non-priority data frames when said network is in said intermediate state.

Another aspect of the invention is directed to a determination module for determining a transmission instant for a data frame over a multiple-access shared communications network conveying data streams structured as data frames and comprising at least one priority data stream and at least one non-priority data stream; said determination module being suitable for co-operating with a transmit/receive terminal as described above; said module including determination means for determining the instant at which the data frame is transmitted and transmission means for transmitting said data frame over the network. Such a module also comprises means for receiving a parameter for weighting a data-frame transmission instant, which parameter is calculated by said terminal, and in that said determination means take said received weighting parameter into account when determining the transmission instants of the data frames.

By way of example, such a module is implemented in a network card, e.g. an Ethernet card.

DETAILED DESCRIPTION OF THE DRAWINGS

Figure 1:
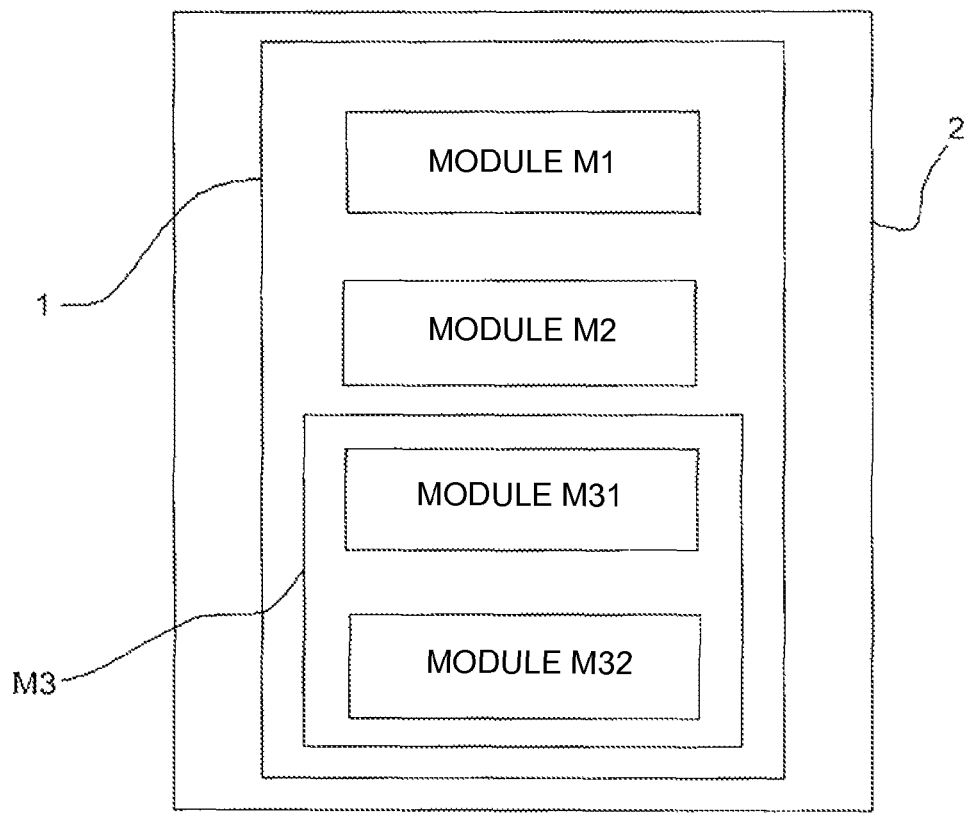
FIG. 1 is a diagram of a terminal in which a self-adaptive mechanism of the invention for managing data streams is implemented.

A self-adaptive system for managing data streams 1 as shown diagrammatically in FIG. 1 comprises three modules M1, M2, and M3, that co-operate with one another in order to improve quality of service in a multiple-access shared network. For this purpose, the self-adaptive system 1 is implemented in a terminal 2 connected to a multiple-access shared network in order to manage the transmitting of data streams coming from the terminal 2. The terminal 2 transmits different types of data stream, both so-called priority data streams that need to be forwarded in real time, e.g. because they are multimedia streams, and non-priority data streams, e.g. text data.

The function of the module M1 is to determine the congestion state of the network. To do this, the module M1 collects information about data traffic on the network. Information is collected by listening to network carriers during a collection period of duration $\Delta t_i$. Once the information has been gathered, it is used in order to determine the congestion state of the network for the collection undertaken, and also a weighting parameter for weighting a transmit instant for a data frame $S_i$. This module M1 is situated in the terminal 2.

Carrier-listening consists in each of the terminals connected to the network analyzing the information streams passing through the network. By way of example, this listening is performed by means of protocols such as the carrier sense multiple access (CSMA) protocol. This listening enables a first terminal to determine whether a second terminal is transmitting data frames over the network. When the first terminal detects transmission by the second terminal, it delays transmitting its own data frames over the network in order to avoid collision between the data frames coming from the two terminals. When a collision occurs on the network, the data contained in the colliding data frames is lost.

Carrier-listening enables the terminals that have transmitted frames that entered into collision to detect the collision. The terminals concerned then stop transmitting. Thereafter, they transmit over the network a scrambling frame having the function of amplifying collision so that all of the terminals of the network detect the collision and delay transmitting their own data in order to avoid network congestion.

A second module M2 and a third module M3 serve to manage the bit rate of the data frames transmitted by the terminal 2 as a function of a network congestion state.

The function of the module M2 is to manage the bit rate of non-priority data streams, i.e. the streams that are sent the most frequently in the network, so as to deliver a constant non-priority data stream bit rate at the input to the module M3. The module M2 is situated in the terminal 2.

The function of the module M3 is to manage the transmission over the network of data streams regardless of whether they are priority data streams or non-priority data streams.

In an embodiment of the present invention, the module M3 is constituted by a module M32 having the function of determining the instants at which data frames are transmitted over the network, as a function of the weighting parameter for weighting a transmit instant for a data frame $S_i$. By way of example, the module M32 is a network card connected to the terminal 2. Such a card provides interconnection between the terminal 2 and the network.

In another embodiment of the present invention, the module M3 comprises a module M31 and the module M32. The module M31 served to deliver authorizations to transmit as a function of the congestion state of the network as determined by the module M1. The module M31 is also situated in the terminal 2.

In this embodiment, only those data frames to which the module M31 has delivered a transmit authorization are processed by the module M32.

The various modules M1, M2, and M3 constituting the self-adaptive system 1 for managing data streams are distinct from one another, such that each of them can be modified independently of the others. Nevertheless, the modifications made to the various modules must not harm their ability to co-operate with one another. The same applies to the modules M31 and M32 constituting the module M3 for managing the transmitting of data streams.

Figure 2:
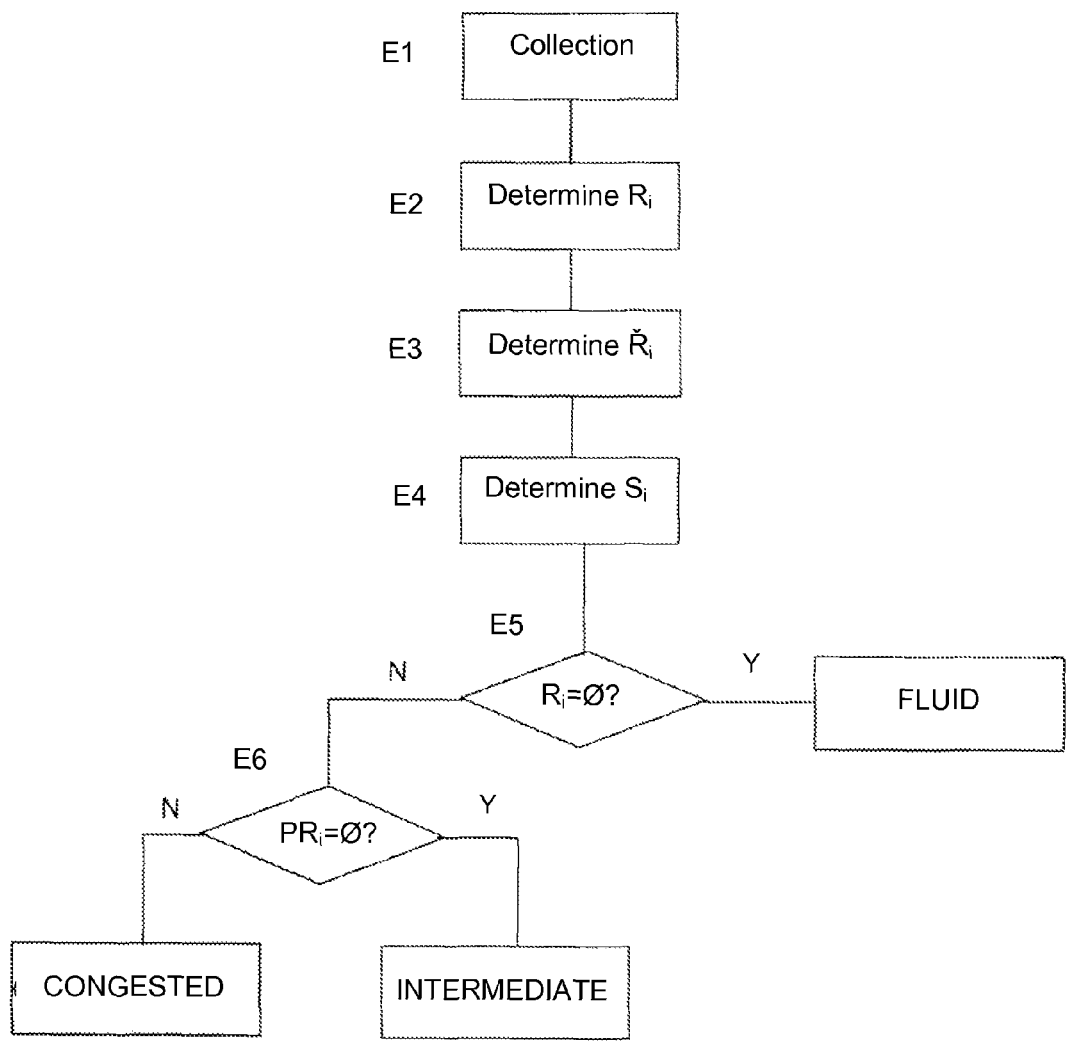
FIG. 2 shows the operating algorithm of a module for determining a congestion state of the network constituting the mechanism for managing data streams implemented in the FIG. 1 terminal.

The operating principle of the module M1 for determining a congestion state of the network is described below with reference to FIG. 2.

A collection is a period of duration $\Delta t$ during which the network is observed. During this period, the module M1 collects the data needed for determining a congestion state of the network. This corresponds to a step E0. In order to update the congestion state of the network and thus improve the quality of service, the module M1 performs successive collections i. The duration $\Delta t_i$ of a collection i depends on the congestion state of the network as determined during the preceding collection i−1. This makes it possible to make the system 1 of the invention more reactive.

During this collection step E0, the module M1 stores three distinct values: the total number $OT_i$ of bytes transmitted during the collection; the number $PR_i$ of priority frames retransmitted more than N times during said collection; and finally the number $OC_i$ of bytes that have suffered a collision during said collection. The number N is predetermined integer. In a particular embodiment of the present invention, N has the value 10. The index i represents the collection during which the values TO, PR, and OC were stored by the module M1.

In a second step E2, the module M1 calculates the collision rate $R_i$ for collection i. The collision rate $R_i$ is the ratio of the number $OC_i$ of bytes that have suffered a collision divided by the total number $OT_i$ of bytes transmitted. The greater the duration $\Delta t_i$ of the collection i, the more the collision rate $R_i$ tends towards the mean value for the number of collisions occurring on the network. Conversely, the shorter the duration $\Delta t_i$ of the collection i, the more the collision rate $R_i$ tends towards an instantaneous value for the number of collisions occurring on the network.

During a step E3, the module M1 determines a weighting coefficient $\check{R}_i$ for the collection being performed as a function of the measurements made during the preceding collections.

In an embodiment of the invention, the weighting coefficient $\check{R}_i$ is obtained using the following formula:

$$\check{R}_i = [(1-\xi)*R_i] + (\xi*\check{R}_{i-1})$$

Figure 5:
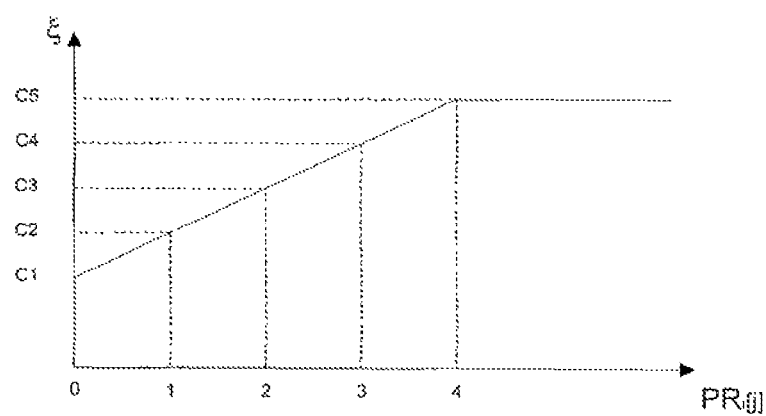
FIG. 5 shows an example of how a function $\xi$ involved in calculating the weighting parameter for the frame transmitting instant varies as a function of the number of priority frames retransmitted more than N times during the same collection.

The weighting function $\xi$ varies as a function of the number $PR_i$ of priority frames retransmitted more than N times during collection i is stored in the module M1. The values of $\xi$ vary over the range 0 to 1 and they increase with increasing value for $PR_i$. An example of how $\xi$ varies is shown in FIG. 5.

Values for the function $\xi$ are given by way of example in the following table:

| $\xi$ ($PR_i = 1$) | $\xi$ ($PR_i = 2$) | $\xi$ ($PR_i = 3$) | $\xi$ ($PR_i = 4$) | $_i$($PR_i = 5$) |
|---|---|---|---|---|
| 0.75 | 0.8 | 0.85 | 0.9 | 0.95 |

When $\xi$ is close to zero, the first member of the above equation is of greater weight than the second. Under such circumstances, that means that the current collection has more weight than the preceding collection in determining the weighting coefficient $\check{R}_i$. Account is taken of the weighting coefficient $\check{R}_{i-1}$ for the preceding collection while determining the weighting coefficient $\check{R}_i$ for the current collection in order to improve management of the transmitting of data frames by adapting it to the congestion state of the network.

Once the value of the weighting coefficient $\check{R}_i$ has been determined, the module M1 determines the value of the weighting parameter of a transmitting instant for a data frame $S_i$ during a step E4. The value of the weighting parameter $S_i$ is the minimum value of a pair ($\check{R}_i$; α) where α is a constant of value set by the user of the terminal 2. The value α serves to avoid stagnation of the instant at which a data frame is transmitted in the event of there being collisions. The initial value of $S_i$ is equal to α.

Once the value of the collision rate $R_i$ and the value of the weighting parameter for weighting an instant for transmitting a data frame $S_i$ have been determined, the module M1 proceeds to determine a congestion state of the network.

To determine the congestion state of the network, the module M1 uses the following variables: the number $PR_i$ of priority frames retransmitted more than N times during said collection; and the collision rate $R_i$ for the current collection. Combining these two variables gives four states for the network, three of which are orthogonal:

a first state in which the collision rate $R_i$ is zero and no priority data frame has been retransmitted, this is the non-congested state;

a second state for which the collision rate $R_i$ is not zero but no priority data frame has been retransmitted, this is the intermediate state; in this state only non-priority data frames are subject to collisions;

a third state for which the collision rate $R_i$ is not zero and at least one priority data frame has been retransmitted more than N times during the collection, this is the congested state; and a fourth state is an impossible state in which the collision rate $R_i$ is zero but at least one priority data frame has been retransmitted more than N times during the collection.

During a step E5, the module M1 tests the collision rate $R_i$. If the value of the collision rate $R_i$ is zero, then the network is in the non-congested state. If the result of the test shows that the value of the collision ratio $R_i$ is not zero, then the module M1 executes step E6.

During step E6, the module M1 tests the number $PR_i$ of priority frames that have been retransmitted more than N times during the collection. If this number is zero, then the network is in an intermediate state.

If the test carried out during step E6 shows that the number $PR_i$ of priority frames retransmitted more than N times during the collection is not zero, then the network is in the congested state.

Once the congestion state of the network has been determined, it is forwarded to the modules M2 and M3. The same applies to the weighting parameter for weighting an instant at which a data frame $S_i$ is to be transmitted.

Figure 3:
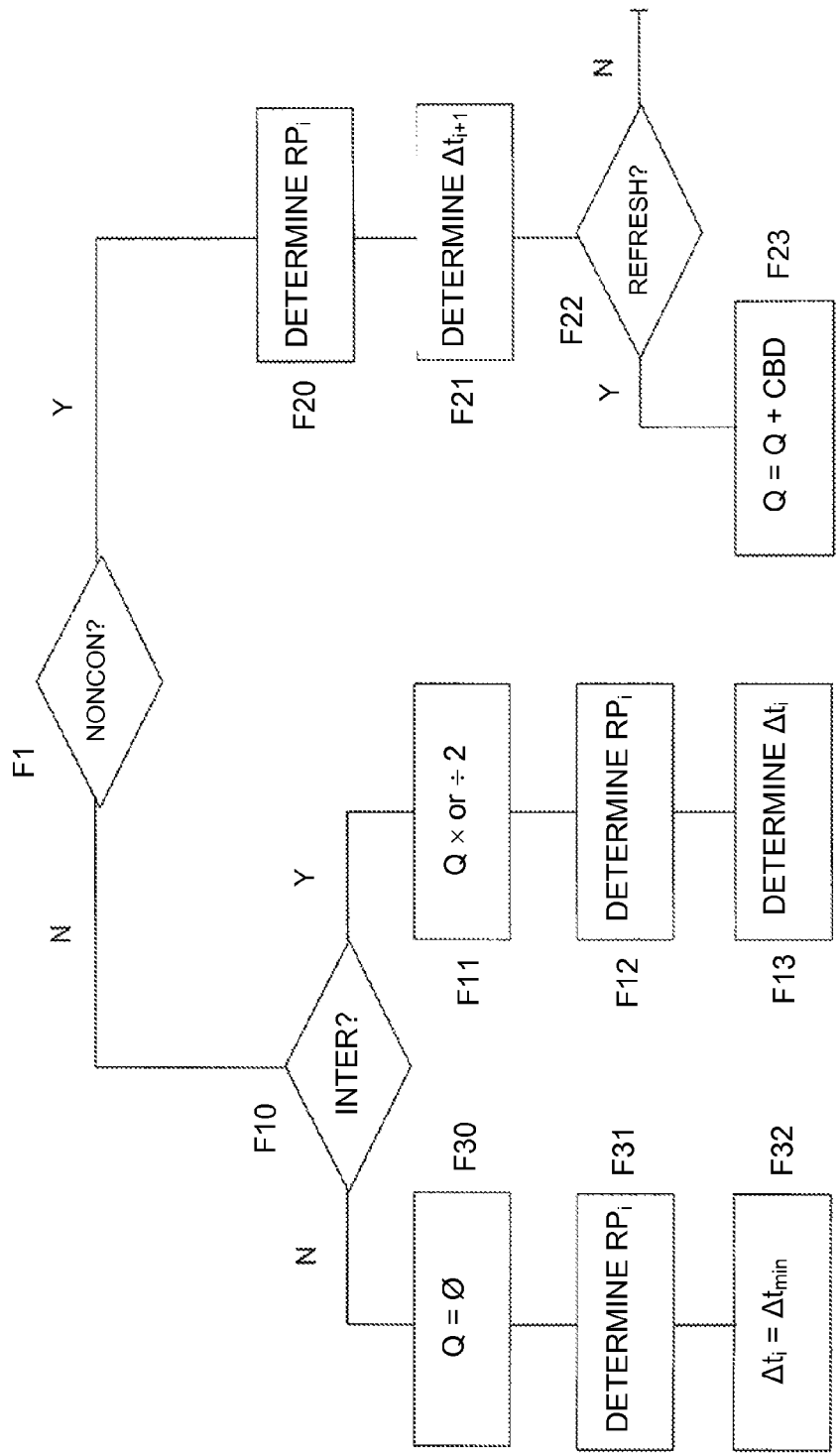
FIG. 3 shows the operating algorithm of a module for managing the bit rate of non-priority data frames constituting the mechanism for managing data stream implemented in the terminal of FIG. 1.

The operating principle of the module M2 for managing the bit rate of non-priority data frames is described below with reference to FIG. 3.

Depending on the congestion state of the network, the module M2 modifies the values of various parameters, including collection duration.

In a particular embodiment of the invention, the module M2 manages the bit rate of non-priority data frames by means of an algorithm known as the token bucket algorithm.

The token bucket algorithm is a mechanism for regulating the bit rate of a data stream. The bucket modeled by this algorithm contains a maximum number CBD of tokens. Once every RP seconds, where RP corresponds to the refresh period of the token bucket, a new token is generated by the algorithm and injected into the bucket. When a data packet is transmitted over the network, the number of tokens in the bucket is reduced by a quantity equal to the number of bytes making up the packet. When the token bucket contains no more tokens, then no data packet can be transmitted over the network. Nevertheless, if a single token remains in the token bucket when a data packet is presented, then the packet is transmitted over the network and the number Q of tokens remaining in the token bucket can go negative.

In a first step F1, the module M2 tests whether the network is in the non-congested state.

If the network is in the non-congested state, the module M2 executes step F20.

During step F20, the module M2 determines the refresh period $RP_i$ of the token bucket algorithm serving to regulate the bit rate of non-priority data frames. This value is selected to be the maximum value of a pair ($RP_{MIN}$; $RP_{i-1}$–D) where $RP_{MIN}$ is the minimum value that RP can take and where D is a decrement. The values of $RP_{MIN}$ and of D are set by the user of the terminal or they may be predetermined, e.g. by the operator of the network. By increasing the value RP of the refresh period of the token bucket, the risk of non-priority frames being sent in bursts is reduced. Such an event would have the consequences of generating collisions on the network and would cause the network to go from a non-congested state to an intermediate state or even a congested state, which is prejudicial to quality of service.

During a step F21, the module M2 determines the duration for the next collection $\Delta t_{i+1}$. This value is selected as being the minimum value of a pair ($\Delta t_{MAX}$; $2\Delta t_i$) where $\Delta t_{MAX}$ is the maximum duration of a collection and $\Delta t_i$ is the duration of the preceding collection. The value of $\Delta t_{MAX}$ is set by the user of the terminal 2 or by the network operator, for example. This new collection duration is sent to the module M1 so as to enable the module M1 to proceed with a new collection under conditions defined by the module M2.

In a step F22, the module M2 tests whether the time given by its internal clock corresponds to a time for refreshing the token bucket algorithm. If not, the module M2 executes step F1 again.

If the time of the internal clock of the module M2 corresponds to a time for refreshing the token bucket algorithm, then the module M2 executes step F23.

During this step, the module M2 adds a number CBD of tokens to the quantity Q of tokens already present in the token bucket. Thus, the number of tokens contained in the bucket is the minimum value of the pair (Q+CBD; CBD).

The steps F20, F21, F22, and F23 have the consequence of increasing the rate at which non-priority data frames are transmitted. Since the network is in the non-congested state, it is advantageous to increase the number of frames that are transmitted since there are no collisions, and quality of service is thus satisfying.

If the result of the test performed during step F1 indicates that the network is not in the non-congested state, then the module M2 executes step F10.

During this step, the module determines whether the network is in the intermediate state or the congested state.

If the network is in the intermediate state, then the module M2 executes step F1.

During step F11, the number of tokens contained in the token bucket is divided by two if Q is positive or is multiplied by two if Q is negative. This has the consequence of decreasing the number of non-priority data frames that will be transmitted, and thus of encouraging the transmission of priority data frames, by reducing the number of collisions generated by the non-priority frames.

During step F12, the value $RP_i$ of the refresh period is selected as being the minimum value of the pair ($RP_{MAX}$; $2RP_{i-1}$).

During step F13, the collection duration $\Delta t_i$ is the maximum value of a pair ($\Delta t_{MIN}$; $S_{i-1}*\Delta t_{i-1}$) where $S_{i-1}$ is the weighting parameter for weighting an instant for transmitting a data frame as determined by the preceding collection. This new collection duration is sent to the module M1 so that it can proceed with a new collection.

Steps F11, F12, and F13 serve to decrease the bit rate of non-priority data frames and to lengthen the collection duration. By reducing the number of non-priority data frames sent over the network, this makes it possible to reduce the number of collisions that occur in the network so as to bring the network back to the non-congested state as quickly as possible.

If the network is in the congested state, then the module M2 executes step F30.

During this step, all of the tokens contained in the token bucket are deleted, so that Q is equal to zero, thus preventing non-priority data frames being sent over the network.

In a step F31, the value of the refresh period of the token bucket is the minimum value of a pair ($RP_{MAX}$; $2RP_{i-1}$).

In a step F32, the collection duration is $\Delta t_{MIN}$. The collection duration is sent to the module M1 so that it can proceed with a new collection. The collection duration is shortened so as to update the congestion state of the network more quickly, and if the newly determined congestion state of the network makes this possible, allow data frames to be transmitted again over the network.

Figure 4:
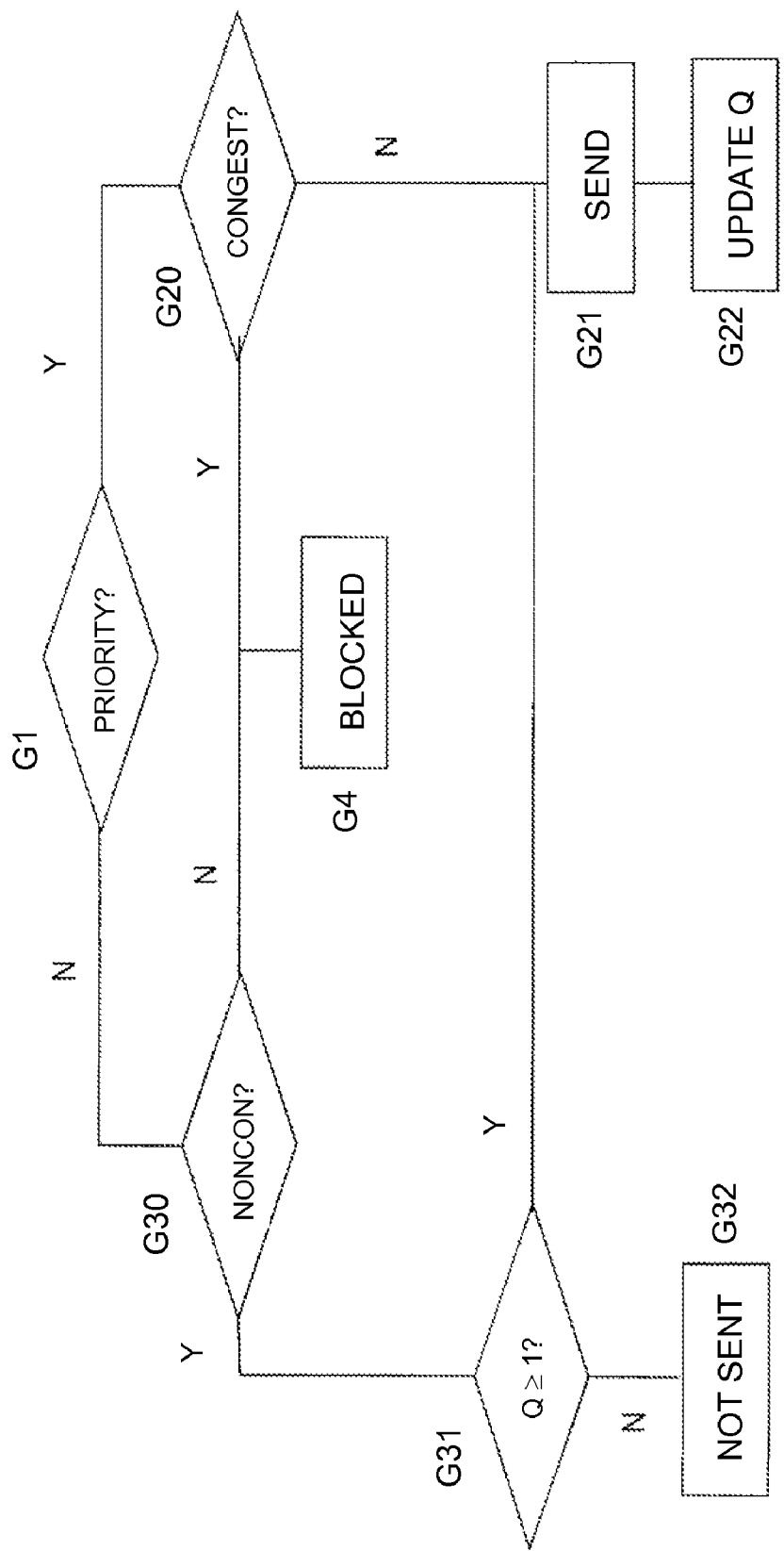
FIG. 4 shows the operating algorithm of a module for managing a transmit instant for a data frame constituting the mechanism for managing data streams implemented in the FIG. 1 terminal.

The operating principle of the module M31 for managing data transmission is described below with reference to FIG. 4.

During a step G1, the module M31 tests the nature of the data frame arriving at the input to said module. If the incoming data frame is a priority data frame, the module M31 executes step G20.

During this step, the module M31 tests the congestion state of the network. If the network is in the congested state, then the module M31 executes step G4. During this step, priority data frames are blocked. This has the consequence that these data frames are not forwarded to the M32. Thus, since all transmission of data frames, whether priority or otherwise, is stopped, any risk of creating additional collisions on the network is eliminated.

If the network is in the non-congested state, or in the intermediate state, the module M31 executes step G21.

During this step, the priority data frames are sent over the network.

During a step G22, the number of tokens in the token bucket is updated as a function of the number of bytes forwarded over the network. Although the priority data frames are not processed by the token bucket, the number of tokens in the token bucket is nevertheless updated so as to reduce the number of non-priority data frames that can be transmitted, thereby limiting the risk of collisions on the network.

If the incoming data frame is a non-priority data frame, then the module M31 executes step G30.

During this step, the module M31 tests the congestion state of the network. If the network is in the non-congested state, then the module M31 executes step G31.

During step G31, the module M31 tests the number of tokens contained in the token bucket. If there remains at least one token, then the method executes steps G21 and G22. Otherwise, the data frame is not sent, which corresponds to step G32.

If the network is in the congested state, the module M31 executes step G4. The non-priority data frames are then blocked so as to limit the risk of congestion and so as to enable priority data frames to be forwarded effectively.

The module M32 for calculating the instant at which a data frame is transmitted calculates a transmission instant for a data frame only for data frames that have been forwarded by the module M31 in the embodiment in which the modules M31 and M32 co-operate with each other.

When a data frame is transmitted over the network, its transmission instant is equal to $n*IT_B$ where $IT_B$ is a base time interval. The number n is a random number lying in the range $[0; W_i]$.

The upper bound of the interval is determined as follows:
$W_i$ is initialized at 1; and then
$W_i=2^{(min(10,K))-1}$ where K designates the number of times the data frame has been retransmitted.

Once the data frame has been sent over the network, the value of $W_i$ is reinitialized. Thus, on the first occasion a following frame is sent to the network, the value of $W_i$ is the maximum value of a pair $(1; S_{i-1}*W_{i-1})$. Thus, the instant at which a data frame is transmitted, regardless of whether the frame is or is not a priority frame, is weighted as a function of the congestion state of the network in order to distribute the sending of data better over time and thus avoid congestion within the network.

The invention claimed is:

1. A method of managing the transmission of data streams generated by a terminal of a multiple-access shared communications network, the communications network including a plurality of terminals connected to a single channel that passes all data streams generated by the plurality of terminals, said data streams being structured in data frames and comprising at least one priority data stream and at least one non-priority stream, wherein the method comprises the steps of:
monitoring, by said terminal, of said multiple-access shared network to detect data frame collisions of data frames transmitted by said terminal in the single channel;
determining a congestion state of said multiple-access shared network based at least in part on a rate of data frame collisions detected by said terminal in the single channel and a number of priority data frames retransmitted more than N times by said terminal during a collection period, where N is a predetermined natural number; and
managing the transmission by said terminal of said priority and non-priority data streams as a function of said congestion state such that a rate at which said priority data streams are transmitted is determined at least in part by a first method and a rate at which said non-priority data streams are transmitted is determined at least in part by a second method, the second method being different from the first method.

2. The transmission management method according to claim 1, wherein during said step of determining said congestion state, a first variable is evaluated that is representative of a collision rate of said data frames transmitted by said terminal in the single channel, and a second variable is evaluated that is representative of a number of priority data frames retransmitted more than N times by said terminal during a collection period, where N is a predetermined natural number, and wherein:
when said first and second variables are zero, said network is in a non-congested state;
when said first and second variables are strictly positive, said network is in a congested state; and
when said first variable is strictly positive and said second variable is zero, said network is in an intermediate state.

3. The transmission management method according to claim 2, wherein said managing step prevents said priority and non-priority data frames being transmitted when said network is in said congested state, and prevents said non-priority data frames being transmitted when said network is in said intermediate state.

4. The management method according to claim 2, wherein said managing step implements a token-based method for regulating the rate at which said non-priority data frames are transmitted, the transmission of a non-priority data frame being conditional, when said network is in said non-congested state, on the presence of at least one token in a regulation mechanism.

5. The management method according to claim 4, wherein the number of tokens present in said regulation mechanism is reduced when said network is in said intermediate state or in said congested state, so as to reduce the bit rate of said non-priority streams.

6. The management method according to claim 2, wherein the duration of said collection period is modified as a function of said congestion state.

7. The transmission management method according to claim 1, wherein said determining step is performed at time intervals corresponding to the duration of said collection period, so as to update said congestion state of said network.

8. The management method according to claim 1, wherein during said determining step, there is also calculated a parameter for weighting an instant at which a data frame is transmitted, said parameter taking account of said first and second variables evaluated during said collection period and during at least one preceding collection period, so as to smooth the transmission instants of at least some of said data frames during said control step.

9. The management method according to claim 8, wherein, when said network is in said intermediate state, the duration of said collection period is weighted by said weighting parameter, so as to improve the reactivity of said control method.

10. A computer program product including program code instructions recorded on a non-transitory medium readable by a computer for implementing, when said program is executed on the computer, the steps of a method of managing the transmission of data streams generated by a terminal of a multiple-access shared communications network, the communications network including a plurality of terminals connected to a single channel that passes all data streams generated by the plurality of terminals, said data streams being structured in data frames and comprising at least one priority data stream and at least one non-priority stream, wherein the method comprises the steps of:
monitoring, by said terminal, of said multiple-access shared network to detect data frame collisions of data frames transmitted by said terminal in the single channel;
determining a congestion state of said multiple-access shared network based at least in part on a rate of data frame collisions detected by said terminal in the single channel and a number of priority data frames retransmitted more than N times by said terminal during a collection period, where N is a predetermined natural number; and
managing the transmission by said terminal of said priority and non-priority data streams as a function of said congestion state such that a rate at which said priority data streams are transmitted is determined at least in part by a first method and a rate at which said non-priority data streams are transmitted is determined at least in part by a second method, the second method being different from the first method.

11. A terminal for transmitting/receiving data streams over a multiple-access shared communications network, the communications network including a plurality of terminals connected to a single channel that passes all data streams generated by the plurality of terminals, said data stream being structured as data frames comprising at least one priority data stream and at least one non-priority stream, wherein the terminal comprises:
means for monitoring of said multiple-access shared network to detect data frame collisions of transmitted data frames in the single channel;
means for determining a congestion state of said multiple-access shared network based at least in part on a rate of detected data frame collisions in the single channel and a number of priority data frames retransmitted more than N times by said terminal during a collection period, where N is a predetermined natural number; and
means for managing the transmission of said priority and non-priority data streams as a function of said congestion state such that a rate at which said priority data streams are transmitted is determined at least in part by a first method and a rate at which said non-priority data streams are transmitted is determined at least in part by a second method, the second method being different from the first method.

12. The terminal according to claim 11, wherein said means for determining a congestion state of said network evaluate a first variable that is representative of a collision rate of said data frames transmitted by said terminal in the single channel, and a second variable is evaluated that is representative of a number of priority data frames retransmitted more than N times by said terminal during a collection period, where N is a predetermined natural number,
and wherein said determination means deliver network congestion state information according to which:
when said first and second variables are zero, said network is in a non-congested state;
when said first and second variables are strictly positive, said network is in a congested state; and
when said first variable is strictly positive and said second variable is zero, said network is in an intermediate state.

13. The terminal according to claim 11, wherein said means for managing the transmission of said data streams comprise:
a module for regulating a transmission data rate for said non-priority data streams, making use of a token-based mechanism, the transmission of a non-priority data frame being conditional, when said network is in said non-congested state, on there being at least one token present in a regulation mechanism; and
a module for managing the transmission of data frames that prevent transmission of said priority and non-priority data frames when said network is in said congested state, and that prevents transmission of said non-priority data frames when said network is in said intermediate state.

14. A determination module for determining a transmission instant for a data frame over a multiple-access shared communications network conveying data streams structured as data frames and comprising at least one priority data stream and at least one non-priority data stream, the communications network including a plurality of terminals connected to a single channel that passes all data streams generated by the plurality of terminals;

said determination module being adapted for co-operating with a terminal for transmitting/receiving data streams over the multiple-access shared communications network, wherein the terminal comprises:

means for monitoring of said multiple-access shared network to detect data frame collisions of transmitted data frames in the single channel;

means for determining a congestion state of said multiple-access shared network based at least in part on a rate of detected data frame collisions in the single channel and a number of priority data frames retransmitted more than N times by said terminal during a collection period, where N is a predetermined natural number; and means for managing the transmission of said priority and non-priority data streams as a function of said congestion state such that a rate at which said priority data streams are transmitted is determined at least in part by a first method and a rate at which said non-priority data streams are transmitted is determined at least in part by a second method, the second method being different from the first method;

said determination module including determination means for determining the instant at which the data frame is transmitted and transmission means for transmitting said data frame over the network;

wherein the determination module comprises means for receiving a parameter for weighting a data-frame transmission instant, which parameter is calculated by said terminal, and in that said determination means take said received weighting parameter into account when determining the transmission instants of the data frames.

15. A method of managing the transmission of data streams generated by a terminal of a multiple-access shared communications network, the communications network including a plurality of terminals connected to a single channel that passes all data streams generated by the plurality of terminals, said data streams being structured in data frames and comprising at least one priority data stream and at least one non-priority stream, wherein the method comprises the steps of:

monitoring, by said terminal, of said multiple-access shared network to detect data frame collisions of data frames transmitted by said terminal in the single channel;

determining a congestion state of said multiple-access shared network based at least in part on a rate of data frame collisions detected by said terminal in the single channel; and managing the transmission by said terminal of said priority and non-priority data streams as a function of said congestion state, wherein said managing step implements a token-based method for regulating the rate at which said non-priority data frames are transmitted, the transmission of a non-priority data frame being conditional, when said network is in said non-congested state, on the presence of at least one token in a regulation mechanism.

16. A terminal for transmitting/receiving data streams over a multiple-access shared communications network, the communications network including a plurality of terminals connected to a single channel that passes all data streams generated by the plurality of terminals, said data stream being structured as data frames comprising at least one priority data stream and at least one non-priority stream, wherein the terminal comprises:

means for monitoring of said multiple-access shared network to detect data frame collisions of transmitted data frames in the single channel;

means for determining a congestion state of said multiple-access shared network based at least in part on a rate of detected data frame collisions in the single channel; and means for managing the transmission of said priority and non-priority data streams as a function of said congestion state, wherein said means for managing is configured to implement a token-based method for regulating the rate at which said non-priority data frames are transmitted, the transmission of a non-priority data frame being conditional, when said network is in said non-congested state, on the presence of at least one token in a regulation mechanism.

17. A computer program product including program code instructions recorded on a non-transitory medium readable by a computer for implementing, when said program is executed on the computer, the steps of a method of managing the transmission of data streams generated by a terminal of a multiple-access shared communications network, the communications network including a plurality of terminals connected to a single channel that passes all data streams generated by the plurality of terminals, said data streams being structured in data frames and comprising at least one priority data stream and at least one non-priority stream, wherein the method comprises the steps of:

monitoring, by said terminal, of said multiple-access shared network to detect data frame collisions of data frames transmitted by said terminal in the single channel;

determining a congestion state of said multiple-access shared network based at least in part on a rate of data frame collisions detected by said terminal in the single channel; and managing the transmission by said terminal of said priority and non-priority data streams as a function of said congestion state, wherein said managing step implements a token-based method for regulating the rate at which said non-priority data frames are transmitted, the transmission of a non-priority data frame being conditional, when said network is in said non-congested state, on the presence of at least one token in a regulation mechanism.

* * * * *